(12) United States Patent
Brand et al.

(10) Patent No.: US 8,040,810 B2
(45) Date of Patent: Oct. 18, 2011

(54) METHOD FOR ROUTING PACKETS IN WIRELESS AD-HOC NETWORKS WITH PROBABILISTIC DELAY GUARANTEES

(75) Inventors: Matthew Brand, Newton, MA (US); Petar Maymounkov, Cambridge, MA (US); Andreas F. Molisch, Arlington, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 510 days.

(21) Appl. No.: 12/324,673

(22) Filed: Nov. 26, 2008

(65) Prior Publication Data
US 2010/0128703 A1 May 27, 2010

(51) Int. Cl.
*G01R 31/08* (2006.01)
(52) U.S. Cl. ........................................ 370/238
(58) Field of Classification Search .................. 370/237, 370/238, 351, 241, 254, 229, 248, 331, 332, 370/338
See application file for complete search history.

(56) References Cited

U.S. PATENT DOCUMENTS

| | | | |
|---|---|---|---|
| 7,944,899 B2 * | 5/2011 | Nordmark et al. | 370/338 |
| 2003/0202468 A1 * | 10/2003 | Cain et al. | 370/229 |
| 2005/0131660 A1 | 6/2005 | Yadegar et al. | |
| 2007/0047841 A1 | 3/2007 | Berkner et al. | |

* cited by examiner

*Primary Examiner* — Kwang B Yao
*Assistant Examiner* — Anh Ngoc Nguyen
(74) *Attorney, Agent, or Firm* — Dirk Brinkman; Gene Vinokur

(57) ABSTRACT

A method determines an optimal route to deliver a packet from a source node via relay nodes to a destination node in a network. A graph of nodes connected by edges represents possible routes in the network. A probability that the packet arrives at the destination before a deadline time is assigned to each edge. A minimal delay route is selected from the possible routes, and an arrival time for delivering the packet using the minimal delay route is determined. The arrival time is comparing to a deadline time, and the probabilities are scaled accordingly until the minimal delay route is an optimal route.

7 Claims, 5 Drawing Sheets

100

200

300

METHOD FOR ROUTING PACKETS IN WIRELESS AD-HOC NETWORKS WITH PROBABILISTIC DELAY GUARANTEES

FIELD OF THE INVENTION

This invention relates generally to determining a route in a wireless communication network from a source to a destination that has minimal delay, and more particularly to routing packets in wireless ad-hoc networks along routes with probabilistic delay guarantees.

BACKGROUND OF THE INVENTION

Determining optimal routes is a frequent problem in many practical transportation, planning and communication applications. Of particular interest to the invention is the case where optimality is defined in terms of delay. For example, in a transportation and distribution system, there may be many possible alternative routes from a source to a destination. It is desired to deliver a packet from the source to the destination along the route that has a guaranteed minimal amount of delay.

In a planning application or manufacturing application, a task or assembly process may involve multiple alternative intermediate step from the beginning (source) to the end (destination). It is desired to complete the task or assemble a part with a guaranteed amount of delay.

In a communications application, it may be necessary to deliver a data packet from a source to a destination along a route with a minimal amount of delay. It should be noted that a minimal delay is distinguished from the more common "shortest" route problem because a shortest route, in terms of physical length, may not always be the fastest.

In the following, a wireless communications network is used as an example application. However, it is understood that the invention can be worked in many other types of routing applications as noted above.

A wireless ad-hoc network, also known as an Independent Basic Service Set (IBSS), is a network in which the communication channels between nodes, e.g., user terminals, stations, transceivers, are wireless. The network is ad hoc because its topology and routing are arbitrary, and any node can forward packets for other nodes. The determination of routes the nodes use to forward data packets is made dynamically based on network connectivity and channel state.

A wireless ad-hoc network can achieve reliable connectivity between nodes of the network. Typically, all nodes have a similar structure and functionality. The nodes are usually battery operated, and packets are forwarded from a source node to a destination node via a set of intermediate relay nodes using wireless channels connecting the nodes.

Unstructured wireless ad-hoc networks have a number of advantages over conventional structured networks, such as the Internet and cellular networks. Wireless ad-hoc networks do not require a fixed infrastructure, such as base stations, a wired backbone and routers specifically designed to route packets. This can reduce cost. Because signals can be transmitted via different alternative routes, reliability is increased. Energy consumption can decrease because intermediate relay nodes can receive and retransmit the signals via more reliable channels. Because the total transmitted energy is decreased, the lifetime of the network is increased, there is less interference, and spectral efficiency is improved. Ad hoc network are especially advantageous for battery operated transceivers.

For this reason, ad-hoc networks are frequently used for emergency response, environmental data collection, factory automation, security and military applications.

In many applications, ad-hoc networks must provide a guarantee for quality-of-service (QoS). One measure of QoS is the amount of delay incurred while transmitting the packet from the source node to the destination node. For example in an ad hoc sensor network, a packet that indicates that a piece of machinery is overheating, or otherwise malfunctioning, must be delivered to a control center before the machine ceases to function and cause more widespread damage.

The QoS in the wireless ad-hoc networks is influenced by a variety of factors including node admission, arrival statistics of packets from higher layers of a network protocol, scheduling and multiple-access mechanisms, properties of the physical layer transmission, and routing.

Due to all these variations, in particular variations in the physical layer, it is not possible to give a perfect guarantee that a packet will arrive at the destination before a deadline. It is only possible to guarantee the packets will arrive in time for a certain percentage of all channel realizations, e.g., 99%. This notion is similar in spirit to the "outage probability" of cellular networks, which defines the probability that a mobile station does not receive sufficient signal power to communicate with a base station.

Henceforth, the probability of on-time arrival is "a "probabilistic guarantee." While stochastic variations of the delay, due to random packet arrival of the source, has been extensively described in the prior art, random variations of the transmission time due to randomly varying channels has not.

Routing is particularly important for the QoS in wireless ad-hoc networks. Routing determines the relay nodes used to forward packets from the source to the destination. Typically, routes are "discovered" and the results are stored in a routing table. A route that fulfills a particular QoS constraint, e.g., delay, is stored and maintained until the route "breaks," i.e., the QoS constraint is violated.

Route discovery methods can generally be categorized as flooding, geometry or stateful. With flooding or "gossiping," packets are transmitted from the source to all or randomly selected nodes. That technique does not require any knowledge of network topology or channel state information (CSI) by the nodes, but is energy inefficient because a large number of nodes are involved.

With geometry-based routing, an optimum route is determined in a central or distributed manner based on the knowledge of the location of the nodes. However, distances between nodes do not necessarily reflect propagation and delay conditions. Therefore, geometry or shortest-route based techniques can lead to suboptimum routes in terms of delay.

In stateful routing, the routing is based on the instantaneous CSI. In this category, the optimum route is determined from a global or distributed knowledge of the instantaneous CSI of all wireless channels between the nodes. For many communication applications, route discovery based on the instantaneous CSI is not practical. The state of a wireless channel can change continuously, particularly when the nodes are mobile. The typical coherence time of wireless channels is on the order of a few milliseconds. Consequently, frequent updates of the CSI throughout the network lead to an unacceptable overhead.

In large networks, the overhead of communicating the routing information for all possible nodes decreases the spectral efficiency of the network and consumes power. On-demand route discovery in large network is also not practical because the route discovery process often takes longer than the permitted delay.

Therefore, it is desired to provide a method for routing that does not have any of the above problems, and that can determine a route that has a guaranteed minimal amount of delay.

SUMMARY OF THE INVENTION

The embodiments of the invention provide a method for determining a route from a source to a destination that has a guaranteed minimal amount of delay. More specifically, the method discovers a route in an ad hoc wireless network so that packets can be sent from the source to the destination along a route so that the packets arrive at the destination within a predetermined deadline. It is understood that the method can be worked in many other practical routing applications.

The embodiments of the invention identify such a route using only an average of channel state information (CSI). The average CSI changes very slowly over time, so that the average CSI can be communicated through a network without undue overhead. The invention uses the average CSI to determine a probability of on-time arrival of packets. Thus, the invention enables a probabilistic delay guarantees. That is, the invention maximizes the probability of on-time arrival of the packet.

The invention provides a convolution-free lower bound on the probability of the on-time arrival of packets, and identifies the route that maximizes this lower bound.

The idea behind the invention is motivated by a class of infinite variance subexponential distributions. These distributions have properties that preclude the use of deviation bounds and convolutional schemes. The lower bound forms the basis of a method that the route that yields probabilistic minimal delay guarantees. The minimal delay method performs better than conventional shortest-route routing methods.

The routing according to the invention is based only on statistics of the CSI, e.g., the average CSI. Such routing can provide probabilistic minimal delay guarantees. In contrast to heuristic prior art routing methods, the present routing method maximizes a lower bound for the probability of on-time delivery.

DETAILED DESCRIPTION OF THE PREFERRED EMBODIMENTS OF THE INVENTION

Figure 1:
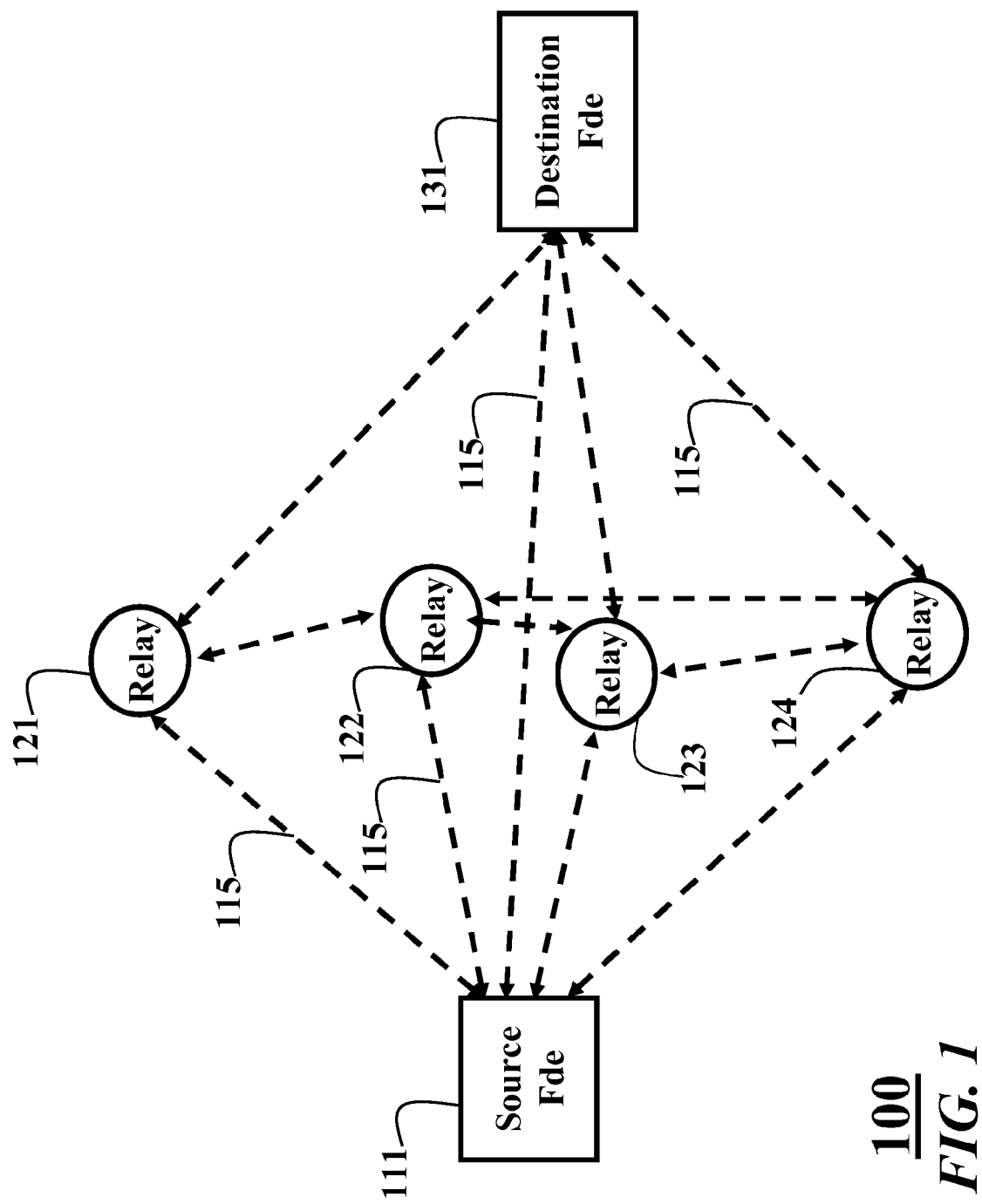
FIGS. 1 and 2 are diagrams of wireless ad-hoc according embodiments of the invention.
Figure 2:
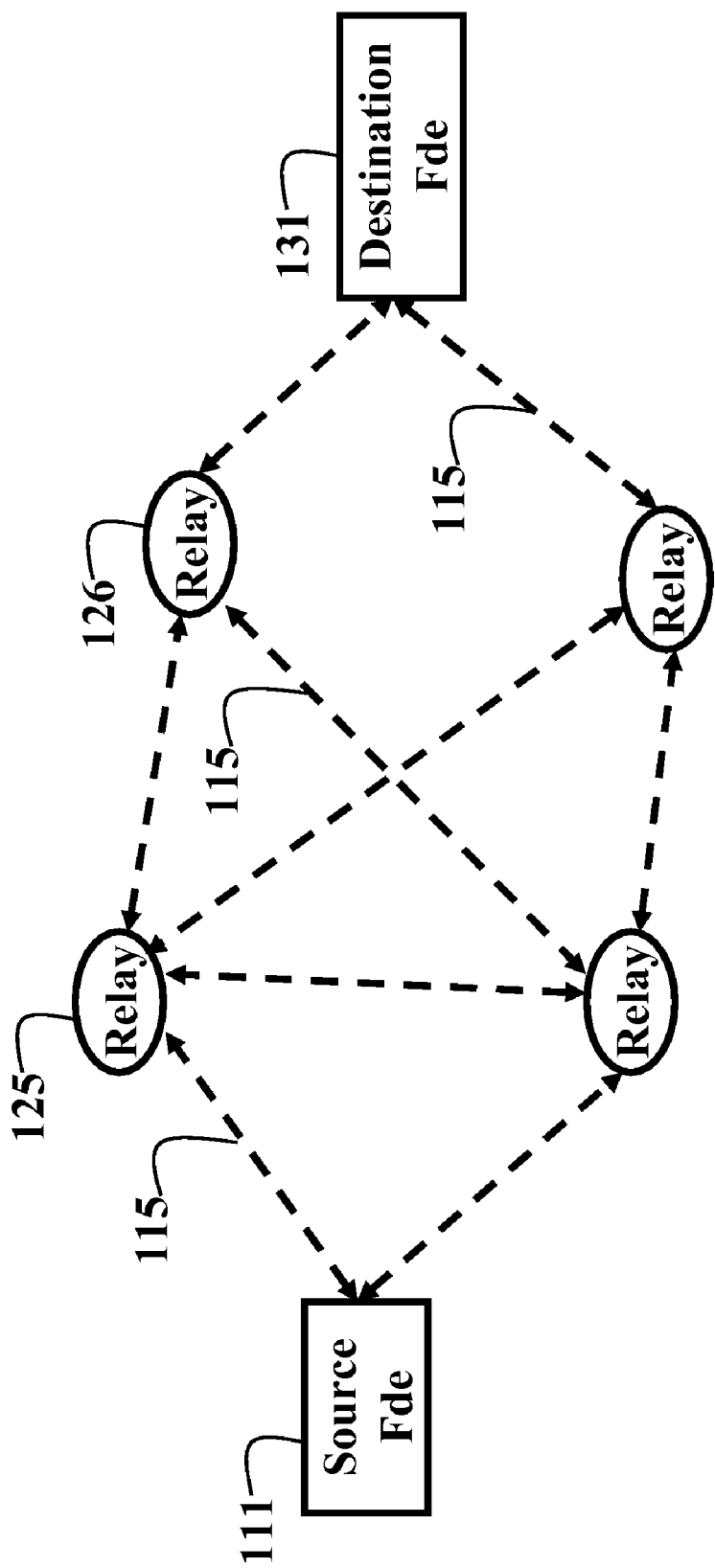

FIGS. 1 and 2 show wireless ad-hoc networks 100 and 200 according to embodiments of our invention. The network 100 includes k nodes, comprising a source node 111, a set of relay nodes 121-124, and a destination node 131, i.e., source, relays, and destination, respectively. The nodes are connected by wireless channels 115, alternatively called hops herein.

It should also be understood, that the embodiments of the invention can also by used with multiple relay "channels" as shown in FIG. 2. In this case, relay 125 also acts as a "source" for an "intermediate" relay 126. This scheme can be extended to additional hops.

Figure 3:
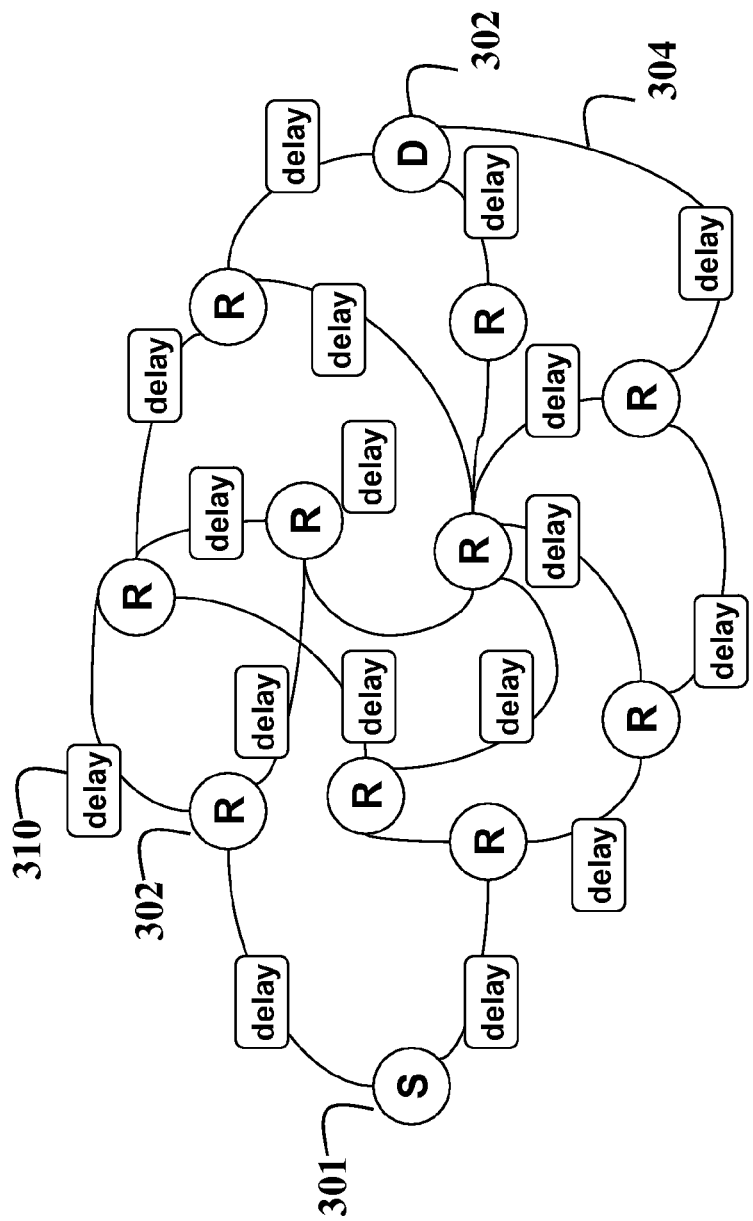
FIG. 3 is a graph of a network according the embodiments of the invention.

Without loss of generality, and as shown in FIG. 3, the networks of FIGS. 1 and 2 can be represented generally as a stochastic graph G 300 with K randomly placed nodes or vertices V, 301-303 connected by edges E 304, i.e., G(V, E). In a communications network, the nodes can be transceiver or sensors, and the edges between the nodes represent the channels 115. The nodes include the source node 101, relay nodes 102, and the destination node 303.

In a manufacturing or planning application, the nodes can represent tasks, with a beginning and end, and the edges are processes. In a transportation application, the nodes are the starting location, intermediate stops, and the final destination, and the edges are roads, airways, or sea lanes. Thus, we generalize the use of our network, nodes, edges, channels and the like, to be of meaning to a wide variety of routing application.

We focus our attention on the delays 310 on the edges between the nodes. The delay can be due to a reliability of the channels connecting the nodes as expressed in the channel state. Because measuring the instantaneous channel state can take time, we use a measure of average channel state.

In a communication network, one measure of reliability is based on the channel state information (CSI). The CSI directly affects the data rate that can be used to deliver packets. On a noisy or unreliable channel, packets may need to be retransmitted repeatedly, at a lower data rate, with more lengthy error-correcting codes. This increases delays. For other applications, reliability and delays can depend on road, traffic or weather condition. In manufacturing, reliability can be assigned to intermediate processing steps associated with the nodes or task.

In our communication network, queuing delays at the nodes are ignored. Furthermore, we consider only a single packet, assuming that other packets (between other transmitters and receivers) are transmitted on orthogonal channels; therefore, interference does not play a role.

The power gain, which is an inverse of the propagation attenuation, along the $i^{th}$ edge (channel) is $\gamma_i$. A probability density function (PDF) of the power gain is $f(\gamma_i)$. The PDF of the gains of the individual channels are assumed to be independent. To make the following description more definite for communication networks, we assume that the channels are subject to Rayleigh fading, i.e., the PDF of $\gamma_i$ is $$f_{\gamma_{ij}}(\gamma_i) = \frac{1}{\overline{\gamma}_i}\exp[-\gamma_i/\overline{\gamma}_i], \gamma_i \geq 0, \quad (1)$$

where the bar on $\gamma_i$ indicates an average channel gain. We assume that the average channel gains in the network vary very slowly, and are available throughout the network. Packets are communicated throughout the network by multiple-hop relaying with ideal physical-layer transmission. In other words, on each channel, transmission is done at the channel capacity, so that the transmission time for a packet with source entropy $H_{target}$ on channel i is $$x_i = \frac{H_{target}}{\log[1+\gamma_i]}, \text{ for } \gamma_i \geq 0. \quad (2)$$

Because the channels are Rayleigh fading, the PDF of the transmission delay over one channel is $$f_{X_i}(x_i) = \frac{H_{target}}{\overline{\gamma}_i x_i^2} \exp\left[\frac{1}{\overline{\gamma}_i} + \frac{H_{target}}{x_i} - \frac{e^{H_{target}/x_i}}{\overline{\gamma}_i}\right] \quad (3)$$

This distribution has an infinite mean and an infinite variance. It is also subexponential. In probability theory, heavy-tailed distributions are probability distributions whose tails are not exponentially bounded. That is, the distributions have heavier tails than the exponential distribution. In our applications, the right tail of the distribution is of interest.

A key property is that the sum of independent identically distributed (i.i.d.) subexponential variables are likely to be dominated by a single variable. Thus, any sample can have extremely large values. Subexponential variables have several other properties that counter conventional methods of probabilistic inference, and cause special problems for determining optimal routing with stochastic delay guarantees. A remarkable property of our method is that it works even for these extremely difficult distributions.

Channel capacity can be approximately achieved by a number of different ways. If the instantaneous CSI is known at the transmitting node, then a near capacity achieving error-correcting code can be used for a specific SNR, e.g., turbo-code or a low-density parity-check (LDPC) code. The CSI knowledge need only be local at the transmitting node. There is no need for network-wide knowledge of the instantaneous CSI. If the instantaneous CSI is not known, then a rateless code can be used.

Our task is to identify a route that maximizes a percentage of all channel states in which the route delay is no larger than a predetermined time threshold t.

We describe a framework for optimizing a probability of an event involving multiple random variables, particularly when integration is infeasible, which makes it impossible to reason about convolutions or moments. The result is a distribution independent lower bound on the probability of the on-time arrival of a packet at the destination.

We describe a stochastic routing method around this bound, give upper and lower bounds for the probability of on-time packet arrival, and show that the method maximizes the lower bound.

Let $X_i$ be a random variable, $x_i$ be a realization of $X_i$. For a set of random variables $X_1, \ldots, X_n$, let $E: x_1, \ldots, x_n \rightarrow \{0, 1\}$ be an inequality that defines an event of interest as a polytope in $\Re^n$. In our applications, the event is the on-time delivery of a packet at the destination, expressed as $E: \Sigma_i x_i \leq t$ for some time deadline $t > 0$. We assume that each event $X_i$ has nonvanishing support on a continuous subset of the nonnegative real numbers, so that the event E is a closed set on $\Re^n \geq 0$. These conditions are fulfilled for the distribution of Equation (3), as well as for many other practically relevant distributions.

Consider the nonlinear probability map to a unit hypercube $P: \Re^n \rightarrow [0, 1]^n$, defined by taking any realization $(x_1, \ldots, x_i)$ to the vector of probabilities $(F_1(x_1), \ldots, F_n(x_n))$, where $F_i(x)$ is defined as $Pr(X_i \leq x_i)$. Applying the probability map P to the event polytope E yields a hypercube region P(E) whose boundary P(∂E) is typically curved. The significance of the probability map P is that the probability is uniform in the hypercube. Therefore, the content (hypervolume) of the region P(E) is precisely the probability of event E. Therefore, we optimize Pr(E)=vol P(E). For most distributions, we cannot evaluate the integral giving this volume, thus we seek distribution-independent lower bounds on the probability Pr(E) of the event.

Definition 1: When the hypercube region P(E) is a convex set, E is a convex event with respect to the set of random variables $X_1, X_2, \ldots, X_n$.

The region P(E) is convex if the event E is convex in $\Re^n$ and each cumulative distribution function (CDF) $Pr(X_i \leq t)$, for $t \geq 0$ is concave. A concave CDF implies a nonincreasing PDF. This may be too restrictive. We begin with the concave CDFs but eventually develop bounds for a much broader class of densities, i.e., densities having nonincreasing right tails.

Knowing only that the event E is a convex event and the location of a point on the boundary P(∂E), we construct a bound by tightly fitting a polytope inside P(E).

Figure 4A:
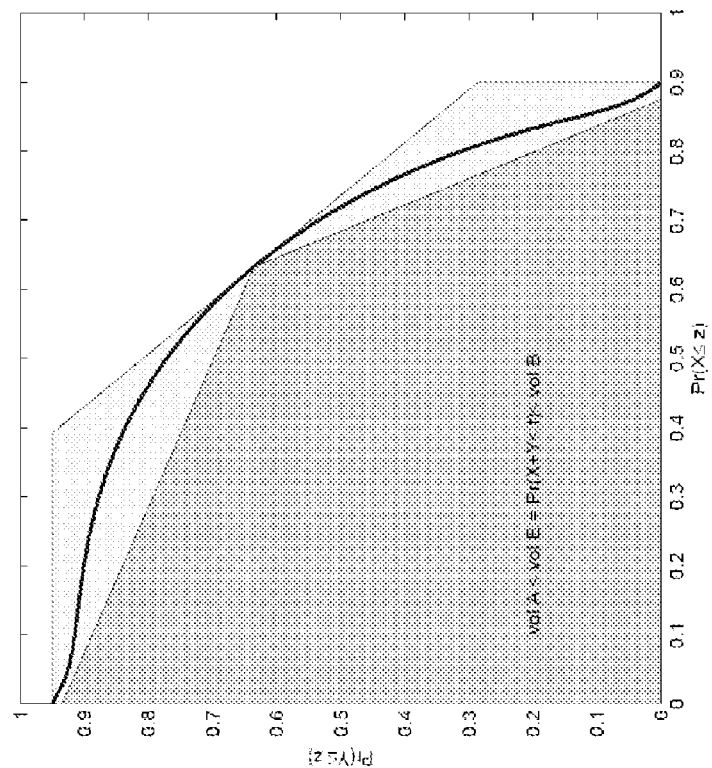
FIGS. 4A-4B are graphs of lower and upper convex and near-convex bounds on a probability of on-time events, respectively.
Figure 4B:
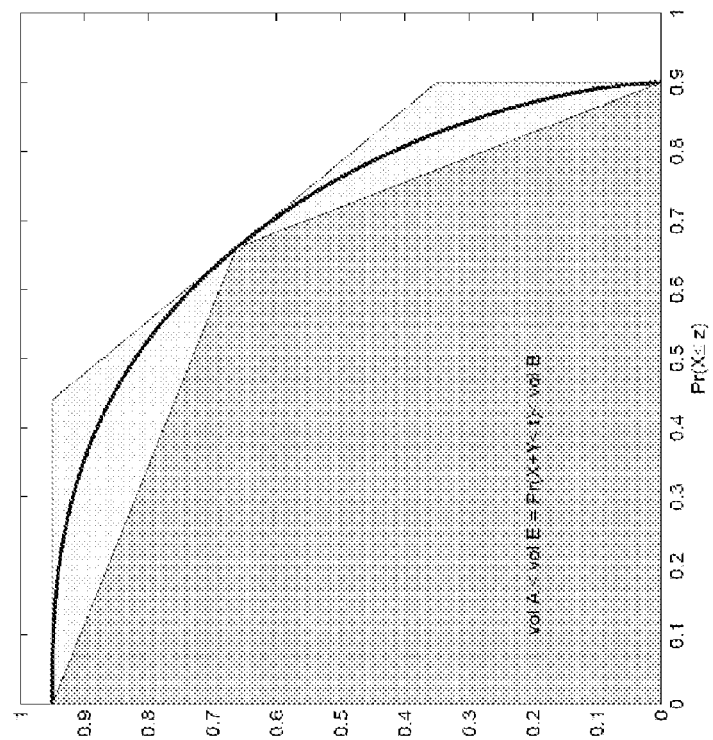

FIGS. 4A and 4B visualize lower and upper diamond shaped bounds on the probability of two-variable events $Pr(X \leq z)$ and $Pr(Y \leq z)$. The area under the curve is the probability of the event vol A≤vol E=Pr(X+Y≤t) vol B. The event, for which the bounds are adjusted, is convex in FIG. 4A, and near-convex in FIG. 4B.

We assume that each CDF has support on $(0, t] \in \Re^n$ so that the boundary makes contact with each hypercube vertex $e_1, \ldots, e_n$ that adjoins the origin. We select some point $p \in P(\partial E)$ on the boundary. Initially, we select $p=p_1$, the point where a ray $1=(1, 1, \ldots, 1)$ from the origin meets the boundary.

Lemma 1: Simple Diamond-Shaped Polytope Bound $Pr(E) \geq 1/d! \, (1+q\sqrt{d})$ where $d \leq n$ is the number of random variables participating in the event and $q=pd^{1/2}-1$. All proof are in the Appendix.

The diamond-shaped polytope includes two simplices spanning the points $\{0, e_1, \ldots, e_n, p\}$ and conjoined at a shared subsimplex spanning $\{e_1, \ldots, e_n\}$. In practice, the region P(E) may not reach the hypercube corners $e_1, e_2, \ldots$, because for some variables, $Pr(X_i > t) > 0$. For example, if the channel gain on a specific channel is too low, then the transmission over this single channel already exceeds the permitted delay time.

Let $m_i$ be defined as $\max_x Pr(X_i \leq x|E)$ be the CDF value of the largest realization of $X_i$ allowed by event E. The lower bound for the probability of on-time delivery is generalized as follows.

Lemma 2: Diamond (Polytope) Bound, Convex Distribution $$Pr(E) \geq \frac{\prod_i m_i}{d!}\left(1 + q\sqrt{\sum_i m_i^{-2}}\right),$$

where $d \leq n$ is the number of random variables participating in the event; $q = \langle\!\langle (p, 1), (z_i-1) \rangle\!\rangle / (\|p\| \cdot \|z\|)$ with $z_i = m_i^{-1}$, and any point $p \in P(\partial E) \subset [0, 1]^n$. For the proof see the Appendix.

In many routing problems, the natural distribution functions do not yield a convex event. We extend the lower bound to such events by identifying a convex subvolume of P(E).

Theorem 1: Diamond Bound, General Distribution

Let $c_j = 0$ for a concave vector of probabilities $F_j$, and otherwise $c_j = \max_{x | F_j''(x) = 0, Pr(X_j \leq x|E) > 0} x$, i.e., the largest sample value where the CDF of $X_j$ inflects and event E is feasible.

If the event E is convex, then each probability function $f_i(x) = F_i'(x)$ is nonincreasing in the right tail. And, $\forall_i p_i \geq c_i$, the convex bound holds with $m_i$ set to the probability of the largest feasible value of $X_i$ that satisfies E when $X_j = c_j$, $X_k = c_k, \ldots$. For example, for event E: $\Sigma_i x_i \leq t$, i.e., the on-time delivery of a packet, $m_i = \max Pr(X_i + (\max_{x_j \neq i} c_j) \leq t)$. The proof is in the Appendix.

Routing Method

In stochastic routing using the graph G=(V, E) 300, we have a combinatorial number of possible routes. For each source to destination route $\mathcal{P} \subseteq E$, we are interested in the event of on-time arrival $$E | \mathcal{P} \Sigma_i X_i \leq t.$$

Our goal is to determine the route $\mathcal{P}$ that maximizes the probability of the event Pr(E| $\mathcal{P}$=vol P (E| $\mathcal{P}$. For most distributions, this problem is NP-hard and sometimes inapproximable. For the PDF in Equation (3), it can even be challenging to numerically approximate vol P(E| $\mathcal{P}$ for a single route $\mathcal{P}$ However, we can determine a route that maximizes the lower bound on the delay, as defined above. To do so, we search along a vector v $\in$[0, 1]$|_{\mathcal{E}}$for a point p on the boundary of the union of all events, $P(\partial(\cup_{Q\in\text{st-routes}} (\mathcal{P} E | Q)))$, in which the vector is a collection of the edge probabilities:

We select a bisection point p along the vector v.

For each edge random variable $X_i$, we determine the sample value $X_i = F_i^{-1}(p_i)$ that satisfies $Pr(X_i \leq X_i) = p_i$.

We select the minimal delay route $\mathcal{P}$ on $\mathcal{G}$ with respect to $x_1, \ldots, m, \ldots, x_n$.

If $\Sigma_i x_i > t+\epsilon$, scaling the probabilities down by bisecting vector closer to 0 and repeat beginning at a step 3.

If $\Sigma_i x_i < t-\epsilon$, scaling the probabilities up by bisecting the vector further from 0 and repeat beginning at step 3.

Otherwise, make the minimal delay route the optimal route.

General Method

Figure 5:
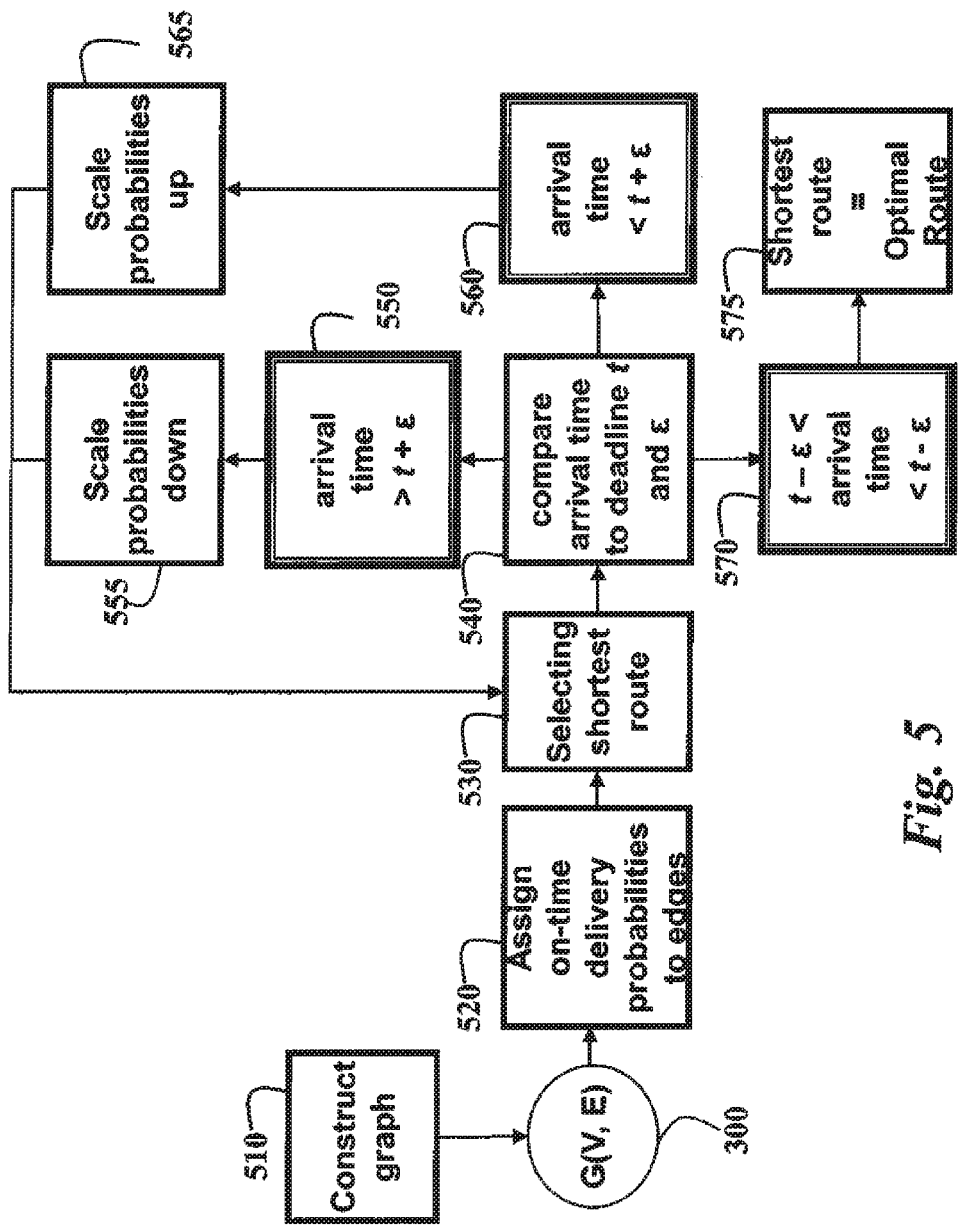
FIG. 5 is a flow diagram of a method for determining a route according to an embodiment of the invention.

FIG. 5 shows a method for determining an optimal route to deliver a packet from a source node via relay nodes to a destination node by a deadline time. We construct 510 the graph 300. In the graph, the nodes represent a source, one or more relays, and a destination. The nodes are connected by edges. We assign 520 an independent probability to each edge that the packet will be delivered to the destination by the deadline time.

We select 530 a minimal delay route. We compare 540 the arrival time to the deadline time and a predetermined small amount of time $\epsilon$, and scale the probabilities down 555 if the arrival time>t+$\epsilon$ 550 and repeating beginning at the selecting step, and scale the probabilities up 565 if the arrival time<t+$\epsilon$ 560 and repeating beginning at the selecting step, and otherwise 570 making the minimal delay route the optimal route 575.

Properties of the Identified Delay Guaranteed Route

If the search vector is v=1, then the selected route $\mathcal{P}$ at p=p1 is amenable to random resampling of any single edge length in the following sense.

Proposition 1: Under single-edge resampling, the selected route is more likely satisfy the on-time arrival event E than any other route. The proof is in the Appendix.

No such guarantee is possible if we redraw two or more edges, because even though $Pr(X_i \leq X_i) = p$, and $Pr(Xj \leq xj) = p$, it is possible that $$Pr(X_i + j \leq x_i + xj) \gg p$$

due to nonlinearity of the distribution functions. This is likely to favor the selected route more than any other route.

Theorem 2

The route selected at point p maximizes the convex lower bound on probability of on-time arrival, see Appendix for proof.

The procedure uses quantiles as a proxy for the delay distributions, and searches for the best set of quantiles for our "routing-under-a-deadline" task. The following description gives some intuition why equiprobable quantiles (v=1) are the most informative.

Definition 2: The event shadow s(E, Q, q) of route Q at point q is the set of all points q" $\in$ P(E|Q) with $q_i \geq q_i$.

The diamond shaped bound itself determined at point p for route $\mathcal{P}$ and in the shadow of point p for all other routes.

It is possible that the bound could favor some other route Q if it is determined at some other point r on Q's event envelope, but outside the shadow of point p. This outcome becomes increasingly rare with graph size.

Maximized Upper Bounds

Here, we describe the construction of an upper bound on the probability of a convex event. A trivial hyperrectangle upper bound $Pr(E) \leq \Pi_i m_i$ arises from the observation $\forall_i 0 \leq Pr(X_i < t) \leq m_i$. This bound can be sharpened by removing the far corner of the hyperrectangle with a cut through point p $\in$P($\partial$E) along the tangent space spanned by the derivatives of P($\partial$E) at point p.

The route $\mathcal{P}$ selected by our method can maximize this upper bound. For any alternate route Q and a point q in the event shadow of point p, we make two observations about the cutting hyperplane in the bound:

Because point q is closer to 0 than p, the hyperplane through q removes off a larger volume; and Because some of the CDF values are reduced at point q, by concavity of CDFs, the corresponding PDF values are increased, and thus, the derivatives of P($\partial$E|Q) at point q are more widely dispersed in value. This makes the tangent space of P($\partial$E) at point q less orthogonal to 1, which also increases the size of the volume removed.

EFFECT OF THE INVENTION

The invention provides a method for routing in networks with probabilistic delay guarantees. The invention provides a middle ground between flooding, which does not require the exchange of CSI, but is extremely energy-inefficient, and optimum routing based on the instantaneous CSI in the network, which might require a large overhead for route discovery and the maintenance of routing tables.

The embodiments of the invention route according to an average reliability of the channels used for delivering a packet from a source to a destination. In a wireless communication network, the average reliability can be based on the CSI, which is updated only very rarely, for example only when nodes enter or exit the network, or when it is detected that a selected route no longer satisfies the on-time delivery guarantee.

Even with this reduced accuracy CSI, it is possible to provide stochastic delay guarantees, i.e., to ensure that packets are delivered on-time in a percentage of cases given by the maximized lower bound.

We provide a novel, yet highly effective method to identify the route that most often fulfills the delay requirement. The method is not heuristic, but rather based on analytical proofs for lower bounds on the probability of success. The method determines routes that give delay guarantees in Rayleigh fading channels.

As a matter of fact, the method is general and can be used in a variety of other applications. First and foremost, it is valid for any fading distribution, like Rice, Nakagami, etc. Because different fading distributions can occur in practical sensor networks, this easy generalizability is important. The method can also be used if the CSI is not the true average, but just some noisy or outdated estimate, as long as the cumulative distribution function of the reliability measure is known.

Although we use a per-channel transmission delay of an ideally coded system in our examples, the routing method is not dependent on this assumption.

Furthermore, it is not necessary to restrict the QoS requirement to transmission delay. Any convex, e.g., additive, QoS constraints can form the basis of the method. The restriction that the PDFs of the edge costs have to be independent can also be removed.

An alternative approach allows only connections between nodes, such that the average channel gain between any pair of "connected" nodes exceeds the minimal required delay. A packet of a known size can be received with some predetermined low probability of error for a particular modulation. Then, the same modulation can be used on every hop and the "time" requirement becomes a "number of hops" requirement. There are many situations where our method, where one fast channel can compensate for the delay of another slow channel, can determine a route that fulfills the delay guarantee while the "number of hops" method fails.

Although the invention has been described with reference to certain preferred embodiments, it is to be understood that various other adaptations and modifications can be made within the spirit and scope of the invention. Therefore, it is the object of the append claims to cover all such variations and modifications as come within the true spirit and scope of the invention.

APPENDIX

Proof of Lemma 1

Because P(E) is convex, it contains the convex hull of $\{0, e_1, \ldots, e_i, p\}$. This hull dissects into a standard simplex on $\{0, e_1, \ldots, e_n\}$, and a regular simplex on $\{e_1 \ldots, e_n, p\}$ that has been "squashed" along a ray 1. The ray intersects their common facet at $d^{-1/2}$. Therefore the squashed simplex has height $q = pd^{1/2} - 1$. The content of the standard simplex is $1/d!$. The common facet is a regular simplex of $d-1$ dimensions with edge length $\sqrt{2}$. Therefore, its content is $$\sqrt{(2d-1)} \cdot \sqrt{(d/((d-1)!\sqrt{(2d-1)}} = d\sqrt{d}/d!.$$

Extending this pyramidally to height q increases the content by factor q/d. Summing the contents give the result.

Remark 2: Consider the $[0, 1]^{-1}$ axis-aligned subspace containing event $P(E|X_k=0)$. If we compute the point $q_k$ where 1 meets this curve, then the content inside convex hull of $[e_1 \ldots, e_{k-1}, q_k, \ldots e_{k+1}, \ldots, e_n, p]$ lies inside P(E), but outside the bound given above, and thus can be added to the bound to tighten it.

Proof of Lemma 2

Using the Cayley-Menger determinant, the content of the lower simplex is $\Pi_i m_i/d!$, and of the shared simplex is $(\Pi_i m_i)d\sqrt{\Sigma_i m_i^{-2}}/d!$. The formula for q is the orthogonal distance from the shared simplex to any p.

Proof of Theorem 1

Consider any two-dimensional slice through P(E) and the axis $e_i$, viewed with $e_i$ as the vertical axis. Because E is convex, the curve generated by the slice through the boundary P(∂E) is nonincreasing. If p can be located on this curve, then because $\forall_i p_i \geq c_i$, the curve has a central segment generated by the right tails of distributions, which must be convex.

Project this segment onto $e_i$. By construction, $m_i$ lies at or below the high end of the projection. Because the curve segment is nonincreasing and convex, any line drawn from $(0, m_i)$ to p lies wholly in P(E). Thus any (upper) simplex with vertices $(m_1 e_1, \ldots, m_n e_n, p)$ lies in P(E). By symmetry of argument, if the slice also passes through $e_j$, the line from $(0, m_i)$ to $(m_j, 0)$ is also in P(E), implying the lower simplex is in P(E).

Proof of Proposition 1

By construction, for any edge in the selected route, we have probability p of remaining in E. For any other route, a new draw must shorten the realized route length, thus the probability of entering E is <p.

Proof of Theorem 2

Any alternative route Q enters E by reducing some nonempty subset of its edge lengths $x_i, x_j, \ldots$, and thereby reducing the probabilities $\Pr(X_i \leq X_i), \Pr(Xj \leq x_j), \ldots$ Let q be a vector $(\Pr(X_i \leq X_i), \Pr(Xj \leq x_j), \ldots$ of the probabilities of Q's realized edge lengths and let vector p' contain the corresponding values in p. Recall that in the diamond bound, the content of the regular simplex is determined by the orthogonal distance of the sample point to the shared facet between the simplices. This distance is reduced, and the regular simplex is more squashed for Q than for P, while all other elements of the bound are conserved.

We claim:

1. A method for determining an optimal route to deliver a packet from a source node via relay nodes to a destination node, comprising:
   constructing a graph of nodes connected by edges representing possible routes from a source node via relay nodes to a destination node in which each edge represents a channel between two nodes;
   assigning, to each edge, an independent probability that the packet arrives at the destination before a deadline time t;
   selecting, from possible routes in the graph, a minimal delay route;
   determining an arrival time for delivering the packet using the minimal delay route;
   comparing the arrival time to the deadline time t and a predetermined small amount of time $\epsilon$;
   scaling the probabilities down if the arrival time>t+$\epsilon$ and repeating beginning at the selecting step;
   scaling the probabilities up if the arrival time<t+$\epsilon$ and repeating beginning at the selecting step; and otherwise making the minimal delay route the optimal route.

2. The method of claim 1, wherein the nodes represent transceivers in an ad hoc wireless communication network and the edges represent channels connecting the transceivers.

3. The method of claim 1, wherein the probabilities are due to randomly varying channels.

4. The method of claim 1, wherein the probabilities are based on average channel state information of the channels.

5. The method of claim 1, further comprising:
   maximizing a probability of on-time arrival of the packet.

6. The method of claim 1, further comprising:
   providing a convolution-free lower bound on the probability of the on-time arrival, and wherein the optimal route that maximizes the lower bound.

7. The method of claim 1, wherein a distribution of the independent probabilities has an infinite mean and an infinite variance, and is subexponential.

* * * * *